United States Patent [19]

Markert et al.

[11] Patent Number: 4,753,708

[45] Date of Patent: Jun. 28, 1988

[54] METHOD FOR HEAT SEALING

[75] Inventors: Gerhard Markert, Ober-Ramstadt; Horst Pennewiss, Darmstadt; Waldemar Schleier, Darmstadt; Reiner Schnee, Darmstadt, all of Fed. Rep. of Germany

[73] Assignee: Röhm GmbH, Darmstadt, Fed. Rep. of Germany

[21] Appl. No.: 35,221

[22] Filed: Apr. 6, 1987

[30] Foreign Application Priority Data

Jun. 16, 1983 [DE] Fed. Rep. of Germany ....... 3321797

[51] Int. Cl.$^4$ .............................................. C09J 5/02
[52] U.S. Cl. ................................... 156/327; 156/334; 428/522; 524/923; 525/86; 525/94; 525/95; 525/96
[58] Field of Search ............................... 156/327, 334

[56] References Cited

U.S. PATENT DOCUMENTS

| | | | |
|---|---|---|---|
| 3,095,388 | 6/1963 | Osmond et al. | 524/560 |
| 3,317,635 | 5/1967 | Osmond et al. | 525/296 |
| 3,551,336 | 12/1970 | Jacobsen et al. | 252/59 |
| 3,598,738 | 8/1971 | Biswell et al. | 252/59 |
| 3,652,515 | 3/1972 | Love . | |
| 3,691,078 | 9/1972 | Johnston et al. | 252/59 |
| 3,950,284 | 4/1976 | Fukuda et al. | 524/461 |
| 4,107,233 | 8/1978 | Hansen | 428/522 |
| 4,198,327 | 4/1980 | Matsumoto et al. | 525/86 |
| 4,290,925 | 9/1981 | Pennewiss et al. | 252/56 S |
| 4,407,689 | 10/1983 | Ohtsuki et al. | 156/327 |
| 4,414,053 | 11/1983 | Karim et al. | 156/327 |
| 4,418,123 | 11/1983 | Bunnelle et al. | 156/334 |
| 4,442,265 | 4/1984 | Haws | 525/91 |
| 4,452,944 | 6/1984 | Dawdy | 156/327 |
| 4,461,809 | 7/1984 | Shiomi et al. | 428/522 |
| 4,477,532 | 10/1984 | Schmukler et al. | 156/334 |
| 4,481,262 | 11/1984 | Shida et al. | 428/522 |
| 4,528,317 | 7/1985 | Theodore et al. | 524/923 |

FOREIGN PATENT DOCUMENTS

| | | | |
|---|---|---|---|
| 0875974 | 9/1979 | Belgium . | |
| 47705 | 3/1982 | European Pat. Off. . | |
| 1644941 | 5/1971 | Fed. Rep. of Germany . | |
| 2059981 | 6/1971 | Fed. Rep. of Germany . | |
| 1769834 | 10/1971 | Fed. Rep. of Germany . | |
| 2606389 | 9/1977 | Fed. Rep. of Germany . | |
| 3126145 | 4/1982 | Fed. Rep. of Germany . | |
| 2470002 | 5/1981 | France . | |
| 56-53165 | 5/1981 | Japan | 525/96 |
| 695527 | 8/1969 | South Africa . | |
| 1239083 | 7/1971 | United Kingdom . | |
| 1246585 | 9/1971 | United Kingdom . | |
| 1246880 | 9/1971 | United Kingdom . | |
| 1572652 | 7/1980 | United Kingdom . | |
| 2077276 | 12/1981 | United Kingdom . | |

OTHER PUBLICATIONS

Chem. Abst. 85:105301k (=Japan 76-65185), 6/76.
Chem. Abst. 86:107624j (=Japan 76-125122), 11/76.
Chem. Abst. 88:137381m (=Japan 77-142687), 11/77.
Chem. Abst. 88:137384q (=Japan 77-142686), 11/77.
Chem. Abst. 86:191008a (=Japan 77-21009), 2/77.
Chem. Abst. 92:7564v (=Japan 79-90346), 11/77.

*Primary Examiner*—Allan M. Lieberman
*Attorney, Agent, or Firm*—Curtis, Morris & Safford

[57] ABSTRACT

A film forming dispersion for the heat sealing of dissimilar substrate said dispersion comprising at least two different types of polymers having different adhesive properties in an organic solvent system, at least one of the polymer types being fully miscible at room temperature with the organic solvent system, both of said two polymer types having an acid number ranging from 0 to 160 mg KOH per gram of polymer, and said dispersion further containing a third graft polymer containing components corresponding to said two different polymer types.

18 Claims, No Drawings

METHOD FOR HEAT SEALING

This application is a division of application Ser. No. 913,646 filed Sept. 30, 1986 and now abandoned, which is a continuation of Ser. No. 617,970 filed June 7, 1984 and now abandoned.

The present invention relates to heat sealable coating compositions containing polymers.

The industrial demand for multilayer composite materials is growing. One field of use is plastic packaging systems, where rigid, semirigid, or flexible materials are used.

Composite materials can be produced both by coextrusion and by laminating. Frequently employed plastic composite materials and their uses are listed in Ullmanns Enzyklopädie der technischen Chemie, vol. 16, pp. 101–103, for example.

Problems are encountered in uniting aluminum, for example, with certain plastics such as polyolefins, or in uniting plastics with one another, for example polymethyl methacrylate with polypropylene.

Heat sealable graft polymers of polyolefins are known from the prior art.

Adhesion to metals, for example, is obtained with ethylene/propylene copolymers onto which adhesion promoting monomers such as (methacryloyloxy)-propyltrimethoxysilane and glycidyl methacrylate have been grafted. (See Japanese patent publications 76-65 185, 76-125 122 and 77-21 089.) polyolefins containing carboxyl groups and having adhesive properties may be obtained by grafting acrylic acid onto ethylene/propylene compolymers (Japanese patent publications 79-90 346 and 76-104 954), for example, or onto ethylene/alkyl acrylate copolymers (published German patent application DOS 26 06 389 and Belgian patent 875,974). Reference is made in the patent literature (Japanese patent publications 77-142 686 and 77-142 687) to emulsifiers for aqueous systems which may be prepared by grafting vinyl acetate/ethylene copolymers, for example, with $\alpha,\beta$-unsaturated acids and esters in organic solvents. Stable suspensions of graft polymers containing carboxyl groups in an organic solvent can be obtained by rapid cooling of a solution of the graft polymer in the organic solvent (European patent publication 47,705). A powdered polyolefin or a polyolefin grafted with acrylic acid is added to this suspension to give a stable suspension with a polymer content between 10 and 25 weight percent.

By a similar procedure, suspensions are obtained from solutions of acrylic acid-grafted polyethylene and paraffin, polystyrene or ethylene/propylene copolymers in heptane (French patent publication 2,470,002).

Modified polyolefin adhesive mixtures containing (a) 0.1 to 40 parts by weight of a graft copolymer of about 70 to 99.999 weight percent of a polyethylene base and 30 to 0.001 weight percent of at least one monomer serving as the graft and comprising at least one polymerizable, $\alpha, \beta$-ethylenically unsaturated carboxylic acid or a corresponding carboxylic anhydride in an amount up to the total amount of 100 percent, and (b) from about 99.9 to 60 parts by weight of a resin mixture of about 25 to 75 weight percent of a linear low density polyethylene and about 75 to 25 weight percent of a polypropylene, to be admixed in an amount up to the total amount of 100 percent, are further known from published German patent application DOS 31 26 145. Being polyolefins, both polymer bases thus are of the same type of polymer. There is nothing in this German patent publication to indicate that these adhesive mixtures can be used in the form of dispersions.

A wide variety of graft polymers is on the market for use as heat sealable coating compositions and also as hot melt adhesives. In the past it has been sought to meet the requirement for sufficient adhesion to metal surfaces through copolymerization or graft polymerization with known monomers containing adhesion promoting groups, and in particular carboxyl groups.

The polymers are generally applied in solid form to the surfaces to be joined or coated and are then conventional thermally joined or heat sealed.

The recently proposed polymer suspensions in organic solvents must be produced by a two step process in which a polymer solution is first rapidly cooled and more polymer is then introduced into it in powder form (European patent publication A 47,705). The particle diameter of the polymer powder should range from 5 to 80 microns. The temperature to which the polymer solution is heated in the first step should be sufficiently high for the polymer to be dissolved. According to the examples, the temperature for dissolving 5 percent of ethylene in heptane is 150° C.

The need for rapid cooling of such a solution militates against the use of this process, especially on an industrial scale. The polymer must subsequently be admixed with the solution in the form of a powder with a specific particle size distribution and obviously special limiting conditions apply to each polymer/solvent system.

Thus, there has been a need for a heat sealable coating composition formed of several polymeric components which will develop adhesive power for dissimilar substrates in different ways. These coating compositions should be producible by as simple technical means as possible and by the use of techniques based on industrial polymerization methods.

This need is met by the process according to the present invention wherein a heat sealable coating composition is provided which is a film-forming dispersion, in an organic solvent system, of at least two polymers of different types and having different adhesive properties. At least one of the polymers is fully miscible with the solvent system at room temperature and each polymer has an acid number from 0 to 160 mg KOH per gram. Finally, the dispersion contains a further polymer comprising components of each of the two aforementioned polymers.

The category of polymer types suitable for the coating compositions of the invention is dictated by the characteristics indicated above. (See also Ullmanns Enzyklopädie, loc. cit.) The acid number of the polymers is defined as the amount of KOH sufficient to neutralize one gram thereof. (See F. D. Snell and L. S. Ettre in Encyclopedia of Industrial Chemical Analysis, vol. 8, pp. 389–395, Interscience Publishers, 1969.)

The dissimilarity of the two different polymer types, hereinafter referred to as A and X, is due to their being composed of dissimilar types of monomers. For example, they are not as a rule compatible with one another in solvents. Dissimilar polymer types include, for example, polyolefins and olefin copolymers (OCP), polyacrylates or polymethacrylates (acrylic resins), and polyvinyl esters, polyvinyl ethers, and polyvinyl amides, if they have dissimilar or noncompatible adhesive properties. The third polymer, composed of the two polymer types A and X, which is further present in accordance with the inventio-n may be a graft or block polymer.

Such a graft polymer, which usually has emulsifying properties, thus is formed of components which correspond to the two polymer types A and X. It may be represented, as a rough approximation, by the formula AX, wherein A and X stand for sequences corresponding to the polymers A and X, respectively.

As a rule, the weight ratio of the total type A polymer units to the total type X polymer units in the dispersion will range from 1:20 to 20:1.

The technical approach underlying the invention will be described below in greater detail with reference to olefin polymers and copolymers (polymer A) on the one hand and to acrylic resins (polymer X) on the other hand.

While formula AX signifies the overall graft polymer to be used in accordance with the invention, A'X' signifies portions of the polymer molecule. Wherein A' stands for a segment of olefin copolymer sequences, hydrogenated polyisoprene sequences, or hydrogenated butadiene/isoprene copolymers and X' is formed of polyacrylate or poymethacrylate sequences.

The olefin polymers and copolymers corresponding to A which are to be used in accordance with the invention are known per se. They are mainly polymers composed of ethylene, propylene, butylene, and/or other olefins having from 5 to 20 carbon atoms and have been proposed in the past for use as heat sealable materials. Their molecular weight generally ranges from 10,000 to 300,000, and preferably from 50,000 to 150,000. Olefin copolymers of the type to be used have been described in published German patent applications DOS 16 44 941, 17 69 834, 19 39 037, 19 63 039 and 20 59 981, for example. When A' is a segment from a hydrogenated polyisoprene, then commercially available block copolymers based on a selectively hydrogenated polyisoprene/polystyrene, for example the product "SHELLVIS 50", are preferred.

Ethylene/propylene copolymers are particularly well suited. Terpolymers incorporating such commonly used third monomers as ethylidene-norbornene [see Macromolecular Review, vol. 10 (1975)] may also be used. However, allowance should be made for their tendency to crosslink on aging. The distribution may be substantially statistical. However, sequence polymers with ethylene blocks may also be used to advantage. The ratio between the ethylene and propylene monomers may be varied within certain limits, the upper limit being about 95 percent both for ethylene and for propylene.

The polymer X or the segment X' is defined as being formed of polyacrylate and/or polymethacrylate sequences. In themselves, that is in the form of a corresponding homopolymer or copolymer, these are soluble in the solvent system L. As a rule, the polymer X or the segment X' is composed to the extent of more than 50 weight percent, and preferably from 80 to 100 weight percent (when based on the segment X', for example), of monomers of the formula $$H_2C=C(R_1)COOR_2, \qquad (II)$$

wherein $R_1$ is hydrogen or methyl and $R_2$ is alkyl or is araliphatic or aromatic having from 1 to 30, and preferably from 1 to 20, carbon atoms. The polymer X or segment X' may further contain monomers of the formula $$H_2C=C(R_1)COOH, \qquad (III)$$

wherein $R_1$ is again hydrogen or methyl, and/or polymerizable acid anhydrides and/or monomers of the formula $$H_2C=C(R_1)(CH_2)_nZ, \qquad (IV)$$

wherein $R_1$ is, once more, hydrogen or methyl and Z is phenyl or alkyl-substituted phenyl, —$COR_3$, $$-O\overset{O}{\overset{\|}{C}}R_3,$$

—$OR_4$, or chlorine, and wherein $R_3$ and $R_4$ are linear or branched alkyl having from 1 to 20 carbon atoms or phenyl, and n is 0 or 1; and/or monomers of the formula $$\underset{R_5}{\overset{R_8}{\diagdown}}C=C\underset{R_6}{\overset{COOR_7}{\diagup}}, \qquad (V)$$

wherein $R_5$ and $R_8$ are hydrogen or —$COOR_7'$ and $R_6$ is hydrogen or —$CH_2COOR_7''$, a condition being that the compound contain two carboxyl-bearing groups, and $R_7$, $R_7'$, and $R_7''$ are hydrogen, linear or branched alkyl having from 1 to 20 carbon atoms, or phenyl. The polymer X or segment X' may optionally further contain monomers of the formula $$\text{ti } H_2C=C(R_1)Bs, \qquad (VI)$$

wherein $R_1$ has its usual meaning and Bs is a nitrogen-containing functional group such as —C≡N or —$CONR_9R_{10}$ wherein $R_9$ and $R_{10}$ are, independently of each other, hydrogen or alkyl having from 1 to 20 carbon atoms or wherein $R_9$ and $R_{10}$ form, with inclusion of the nitrogen, a heterocyclic five- or six-membered ring, or wherein Bs is an inert heterocycle, and in particular is pyridine, pyrolidine, imidazole, carbazole, or lactam, or an alkylated derivative thereof, or wherein Bs is —$CH_2OH$ or $$-COO-Q-R_{11},$$

wherein Q is alkylene or alkyl-substituted alkylene having from 2 to 8 carbon atoms, and $R_{11}$ is —OH, —$OR_7$ or —$NR_9R_{10}$, where $R_7$, $R_8$, and $R_9$ have their earlier meanings and form a five- or six-membered heterocyclic ring together with the nitrogen (and optionally with inclusion of a further hetero atom).

Examples of monomers of the formulas IV and V, respectively, are, in particular, styrene, alpha-methylstyrene, vinyl chloride, vinyl acetate, vinyl stearate, vinyl methyl ketone, vinyl isobutyl ether, allyl acetate, allyl chloride, allyl isobutyl ether, allyl methyl ketone, dibutyl maleinate, dilauryl maleinate, and dibutyl taconate.

The monomers of formulas III to VI generally represent from 0 to 50 weight percent, and preferably from 0 to 20 weight percent, of segment X'. The monomers of formula III and/or formula VI generally amount to not more than 20 weight percent of segment X'. Their amount usually ranges from 0 to 10 weight percent, and preferably from 0 to 5 weight percent.

In a given case, the composition and the amounts of the components of segment X' are advantageously selected on the basis of the desired end use.

The amount of the polar monomers of formulas III and VI generally is not over 20 weight percent. Preferably it ranges from 0 to 10 weight percent, based on the monomers of segment X', and highly preferably from 0 to 5 weight percent. Suitable monomers of formula VI are C- and N-vinylpyridine as well as vinylpyrrolidine and vinylpyrrolidone, vinylcarbazole and vinylimidazole as well as their alkyl derivatives, and particularly the N-vinyl compounds. Other suitable monomers are the hydroxy- and dialkylamino alkyl esters of acrylic or methacrylic acid, and particularly dimethylaminoethyl acrylate and methacrylate, dimethylaminopropyl acrylate and methacrylate, and hydroxyethyl acrylate and methacrylate.

The weight ratio between the segments A' and X' generally ranges from 1:20 to 20:1, and preferably from 1:4 to 1:1.

As a rule, the coating compositions of the invention in the form of OCP dispersions contain the graft polymer A X with its sequences A'-X' in concentrations ranging from 1 to 80 weight percent, and preferably from 5 to 10 weight percent.

The polymer dispersions may be prepared following the guide lines of German patent applications P 32 07 291.0 and 32 07 292.9.

As a rule, the graft polymer A-X is prepared by making a dispersion, with the aid of an appropriate emulsifier, of component A and grafting monomers forming component X onto it under appropriate reaction conditions.

When A is an olefin polymer or copolymer and X is an acrylic resin (system AX with sequences A'X') the emulsifier may have a similar composition (hereinafter expressed as BY, with sequences B'Y', where B, Y, B', and Y' have the same meaning as A, X, A', and Y'. The method for preparing suitable emulsifiers of the type B Y are known per se. For example, the transfer grafting method may be used. (See also Houben-Weyl, Methoden der Organischen Chemie, vol. 1411, p. 114; H. A. J. Battaerd and G. W. Tregear, Polymer Reviews, vol. 16, Interscience [1967].)

To this end, a 10 to 50 percent, and preferably a 20 to 30 percent, solution or a dispersion of an OCP in an appropriate solvent which is inert under polymerization conditions and which normally has a boiling point higher than the process temperature is prepared. Appropriate solvents include butyl acetate as well as aliphatic, cycloaliphatic, and aromatic hydrocarbons, for example. The acrylate or methacrylate monomers of formula II, and optionally the other acrylate or methacrylate monomers of formulas III and IV, are added to these OCP solutions or dispersions in the ratios indicated and polymerization is carried out, with the addition of one or more preferably peroxidic free radical initiators, at temperatures ranging from 60° to 150° C., for a period which usually ranges from 4 to 8 hours. Conversion should be as nearly complete as possible. Peresters such a tert-butyl peroctoate are preferably used as the initiator. The initiator concentration depends on the number of desired grafting sites and on the desired molecular weight of Y. As a rule, the initiator concentration ranges from 0.2 to 3 weight percent, based on the polymer.

If desired, modifiers may be used concurrently to control the molecular weight of y. Suitable modifiers are organosulfur modifiers, for example, and particularly modifiers containing mercapto groups, for example dodecyl mercaptan. The modified concentration generally ranges from 0.1 to 1.0 weight percent, based on the total polymer.

Another method of preparing the graft polymers B Y involves the hydroperoxidation of an OCP as a first step. The hydroperoxide groups so formed in the chain can then initiate in a second step the graft polymerization of the vinyl monomers. (See H. A. J. Battaerd and G. W. Tregear, Polymer Reviews, loc. cit.)

One method of preparing suitable block polymers is anionic polymerization. The procedure then is to polymerize isoprene or butadiene with an appropriate anionic initiator, for example an organometallic compound, and then to react the "living" anionic chain ends with alkyl methacrylate or styrene, for example. The polymers so prepared are then hydrogenated under such conditions that the functional groups present are not attacked.

With regard to details of such preparation, reference is made to the pertinent literature, for example Houben-Weyl, Methoden der organischen Chemie, 14/1, pp. 110 et seq.; Block Copolymers, by D. C. Allport and W. H. Janes, Applied Science Publishers, Ltd., London, 1973; Graft Copolymers, by H. A. J. Battaerd and G. W. Tregnear, Polymer Reviews, vol. 16 (1967); and Block and Graft Polymers, by W. J. Burlant and A. S. Hoffmann, Reinhold Publishing Corp., New York, 1960.

The solvents to be used in the solvent system in accordance with the invention should be selected from among solvents which meet the requirements of coating techniques for synthetic resins. These solvents, which may be used as a mixture if desired, should be inert and generally safe. As a rule, their boiling point should not be above 250° C. at 760 mm Hg.

Suitable solvents include ketones such as methyl ethyl ketone and cyclohexanone, alcohols such as isopropanol or n-butanol, ethers such as 1,4-dioxane and esters such as ethyl glycol acetate and propyl acetate, for example.

The solvent system will generally be selected so that is is capable of forming a dispersion from the components A and X and the graft or block polymer A-X. The solvent system should further be selected with due regard to the compatibility of the polymer components A and X. If A and X are incompatible with each other, a solvent system should be selected which is equally effective for both components. A dispersion will then form on the basis of their incompatibility. When A is compatible with X, the solvent system should be such that at a given temperature it is a better solvent for X than for A. A dispersion will then form on the basis of their different solubilities.

When A is an olefin polymer or copolymer and X is an acrylic resin (seagments A'-X'), the solvent system is preferably such that the olefin copolymers are caused to swell to a degree ranging from 5 to 300 weight percent in the temperature range from 40° to 150° C. This degree of swelling is determined as follows: An OCP film 1 mm thick, 2 cm long, and 0.5 cm wide of known weight is immersed at a specified temperature (see below), which in the case given by way of example is 90° C., and so maintained for 24 hours under isothermal conditions, then removed from the solution with tweezers, freed of adhering swelling agent by means of filter paper, and immediately weighed. The increase in weight in percent, based on the initial weight, is a measure of the swelling. The determination of the swelling should be made at the temperature at which the concentrated OCP emulsion is to be prepared. In accordance with the invention, the swelling at that temperature should range from 5 to 300 weight percent. A requirement for the applicability of this criterion is that maximum swelling be secured under the conditions given above.

It should be noted that mixtures of the solvents described above may also be used for the carrier medium. The solvent system may represent 80 percent, for example, of the polymer dispersions concentrated in accordance with the invention, and under optimum conditions as little as 20 weight percent. It preferably amounts to less than 70 weight percent, and in practice usually from 55 to 40 weight percent.

As explained above, a dispersion of component A is prepared by the use of an appropriate emulsifier, or a homogeneous solution is prepared of component A in the solvent system, with due regard to the compatibility or incompatibility of the polymers, and then component X is grafted onto this component under appropriate reaction conditions. The weight ratio between the components A and X generally ranges from 1:20 to 20:1. The reaction conditions will generally be such that the total polymer content amounts to at least 10 weight percent of the total dispersion, formed by the solvent system and the polymer. The polymer content should be as high as possible. In practice, a polymer content ranging from about 40 to 80 percent is desirable, with polymer contents between 45 and 60 weight percent being regarded as normally attainable.

At an appropriate point during the production process, and preferably on completion of grafting, a binder suitable also for the production of primers, for example a vinyl chloride/vinyl acetate/maleic acid copolymer, may be added to the coating composition for further improvement of adhesion to metallic substrates.

In accordance with the process of the invention, heat sealable coating compositions are obtained in the form of dispersions which possess sufficient stability for further processing. This stability will extend at least over several days, and normally over several weeks or even months.

The heat sealable coating compositions of the invention can be used with heat sealing methods such like those commonly employed in industry. They can be applied to a wide variety of substrates, including, for example, metals, plastics, glass, paper and textiles. The usual coating methods may be used, for example roll coating on an industrial scale, and knife coating with a hand coater on a laboratory scale. After coating, the solvent system must be removed by evaporation. This may be done conventionally, optionally with increased air circulation and externally supplied heat. Usually it is advisable subsequently to heat the material in a drying oven, tunnel kiln, etc. The temperature of the drying oven or tunnel kiln depends largely on the nature of the substrate and on the solvent used. As a rule, it ranges from 100° to 200° C. The heating time will be about one minute, with a range from 20 seconds to several minutes serving as a guide. When metals are being coated, a calendar, for example, heated to the requisite temperature may also be used. On completion of the treatment, a surface film is obtained.

The amount of coating composition applied should be such that a film of the desired thickness is obtained. The film thickness will usually range from 1 to 15 microns and preferably ranges from 2 to 10 microns, exclusive of the thickness of an optionally used primer.

Heat sealing may be done conventionally by the use of apparatus developed for the purpose. The conditions under which it is done (for example, pressure and temperature) depend to some extent on the nature of the substrates and on the specific coating composition used. The heat sealing times usually are very short and range from a fraction of a second to several seconds. Peelable or nonpeelable coatings may be obtained, depending on the conditions employed. Higher temperatures generally promote firm keying of the coating.

The heat sealing temperature usually ranges from 160° to 210° C. for polyethylene, and from 180° to 250° C. for polypropylene. The heat sealing pressure normally ranges from 1 to 10 kp/cm$^2$ and preferably ranges from 3 to 6 kp/cm$^2$.

The heat sealable coating compositions of the invention obviously can be used to heat seal like materials, or similarly acting materials. However, this can frequently also be done satisfactorily with prior art coating compositions.

The coating compositions of the invention lend themselves to the heat sealing of metal substrates, for example, and in particular of aluminum, to a number of commonly used synthetic resins such as polypropylene, polystyrene, and polyvinyl chloride. They are further suited for the heat sealing of aluminum to glass. In some cases, for example when metallic substrates, and particularly aluminum, are used, it may be advantageous to treat, that is to precoat, the substrate with a primer. Such commonly used materials as PVC copolymers containing carboxyl groups (vinyl chloride/vinyl acetate copolymers, or vinyl chloride/vinyl acetate/maleic acid copolymers, such as "VMCH" of Union Carbide, for example) are suitable for use as primers. (See Ullmanns Enzyklopädie, loc. cit.) The primer coating will usually have a thickness from 1 to 2 microns. The plastic substrate to be heat sealed usually need not be coated with a primer. Alternatively, the dissolved primer may be admixed with the polymer dispersion in accordance with the invention. Very good adhesion to aluminum foil, for example, is secured if on completion of heat sealing the primer ("VMCH") amounts to not less than about 2.5 to 5 weight percent of the total coating. When a vinyl chloride/vinyl acetate/maleic acid copolymer is used in heat sealing to a polystyrene substrate, the primer should not represent more than 20 to 40 weight percent of the total coating, and when used in heat sealing to a polypropylene substrate, not more than 2.5 to 10 weight percent. Like the coating compositions of the invention, the primer may be applied by substantially the same methods and devices as in the prior art. The coatings made in accordance with the invention are distinguished by excellent sealed-seam strength and peel strength and by very good blocking resistance and thermal stability.

A better understanding of the present invention will be had from the following Examples, given by way of illustration.

EXAMPLES

Production of a heat sealable coating composition (heat seal coating dispersion)

1. Preparation of emulsifier

In a Witt jar equipped with an impeller type stirrer, splashboard, thermometer, and reflux condenser, 84 g of a 70:30 ethylene/propylene copolymer (representing component B), which had been decomposed thermally and oxidatively in an extruder (and a 1% solution of which in 10W10 Schindler oil had a viscosity from 10.4 to 11 mm /sec at 100° C.), were dissolved in 280 g of butyl acetate (deaerated with dry ice) at about 90° C. and about 250 rpm.

After approximately 1 ½ hours, 20.2 g of methyl methacrylate, 20.2 g of butyl methacrylate, and 1.5 g of tert-butyl peroctoate were added thus forming polymer Y with methyl methacrylate/butyl methacrylate sequences Y' and graft copolymer B Y. After another hours, the charging of 148.3 g of methyl methacrylate, 148.3 g of butyl methacrylate, and 4.5 g of tert-butyl peroctoate as a mixture was begun. The charging time was 3 hours and the speed of agitation was increased to about 300 rpm. Two hours after the completion of charging, another 0.6 g of tert-butyl peroctoate was added. The sump temperature then was held for another 5 hours at about 95° C. A stream of nitrogen was maintained for the entire time. The solution obtained was brownish gray. The solids content amounted to about 60 percent, and the Brookfield viscosity ranged from $7 \times 10^5$ to $9 \times 10^5$ mPa.sec. (At 45 percent, about 4,000 to 8,000 mPa.sec.) A graft copolymer B Y was thus produced consisting of ethylene-propylene sequences B' and methyl methacrylate/butyl methacrylate-sequences Y' and an acid number of zero.

2. Preparation of dispersion 100 g of the emulsifier of Example 1 and 270 g of methyl isobutyl ketone were charged to the same apparatus, mixed with a little dry ice, and heated to about 90° C. at 400 rpm. After 1 hour, 150 g of an ethylene/propylene copolymer (70:30) with addition of a diene having 2.5 C-C double bonds per 1,000 C atoms (product "BUNA 437" of Chemische Werke Hüls) representing A with ethylene/propylene-sequences A' was stirred in at a reduced speed of agitation. The material is not dissolved in the solvent, but was dispersed under agitation i.e. under shearing conditions. The polymer is however swellable in methyl isobutyl ketone when kept for 24 hours at 85° C. (measured as described on pg. 12) to a degree of 100%. The sump temperature was increased to 95° C. and after 2½ hours another 75 g of the ethylene-propylene copolymer were added. One hour later still another 75 g of the ethylene-propylene copolymer were added. The sump temperature was then reduced to 85° C. and, after ½ hour, 50 g of methyl isobutyl ketone were added. Heating was then continued for another 7 hours at 85° C. Here, too, a stream of nitrogen was maintained for the entire time. The dispersion obtained was blue gray and had a solids content consisting of A of about 59 percent and a Brookfield viscosity ranging from 75 to 150 mPa.sec.

3. Preparation of coating dispersion (grafting)

250 g of the dispersion from Example 2 containing a polymer A, 49.3 g of methyl methacrylate, 49.3 g of butyl methacrylate, 169 g of methyl isobutyl ketone, and 1 g of tert-butyl peroctoate were heated in the same apparatus to 85° C. at 160 rpm (thus forming polymer X with methyl methacrylate/butyl methacrylate sequences X' and graft copolymer A X). After 3 hours, another 0.2 g of tert-butyl peroctoate was added. The sump temperature was held at 85° C. for another 13 hours. Before further heating, a little dry ice was added. A stream of nitrogen was maintained for the entire time.

A white to blue gray dispersion was obtained containing polymer A X with ethylene/propylene sequences A' and methyl methacrylate/butyl methacrylate sequences X' and an acid number of zero. Solids content, about 45 to 48 percent. Brookfield viscosity, 15,000 to 55,000 mPa.sec.

4. Example of use An aluminum foil about 40 microns thick was coated with a hand coater with a primer of the following composition to a film thickness of 1 to 2 microns (dry) and after evaporation of the solvent dried in a laboratory drying oven for 1 minute at 180° C.

| Primer: |
|---|
| 10% vinyl chloride/vinyl acetate/maleic acid copolymer of Union Carbide ("Vinylite VMCH") |
| 90% ethyl acetate |
| 100% |

A heat seal coating dispersion of the composition given below was then applied on top of the primer, again by the use of a hand coater, to give a film thickness of about 6 to 7 microns when dry, and also dried for 1 minute at 180° C.

Heat seal coating dispersion:

| 62 wt. % of the concentrated olefin copolymer dispersion prepared in Example 3 |
|---|
| 38 wt. % methyl ethyl ketone |
| 100 wt. % |

The aluminum foil so coated was then heat sealed with a laboratory heat sealing apparatus onto foils of untreated polypropylene, polyvinyl chloride, and polystyrene, and also onto small glass plates (microscope slides), under the following conditions:

|  | Polypropylene, glass | PVC, polystyrene |
|---|---|---|
| Heat sealing temperature | 200° C. | 180° C. |
| Heat sealing pressure | 6 kp/cm$^2$ | 3 kp/cm$^2$ |
| Heat sealing time | 1 sec | 0.5 sec |

The specimens, maintained under standard climatic conditions (23° C., 50% relative humidity), were then cut into strips 15 mm wide and tested in a tensile testing machine in conformity with DIN 51,221. (In the case of glass, slides 25 mm wide were used.)

The sealed seam strength is stated in terms of the force required to delaminate the composite foil and the peel strength is given in N for strips 15 or 25 m wide.

For determination of the thermal stability, the heat sealed plastic foil is suspended by its free end in a laboratory drying oven at 60° C. and the free end of the aluminum foil is weighted with a 200 gram weight. The thermal stability is considered good when the adhesion between aluminum and plastic is intact after the specimen has been maintained for one hour under the conditions stated.

| Thermal stability | Substrate | Sealed-seam strength |
|---|---|---|
| Good | Polypropylene | About 8 N |
| Good | Polystyrene | 9 to 10 N |
| Good | PVC | About 10 N |

| Thermal stability | Substrate | Sealed-seam strength |
|---|---|---|
| — | Glass | 10 to 15 N* |

*depending on the glass

5. Preparation of coating dispersion (grafting)

252 g of dispersion from Example 2, 5.55 g of acrylic acid, 24.97 g of methyl methacrylate, 24.97 g of butyl methacrylate, 92.6 g of methyl isobutyl ketone and 0.56 g of tert.-butyl peroctoate were heated in the same apparatus to 85° C. at 160 rpm. After 3 hours another 0.56 g of tert.-butyl peroctoate was added. A stream of nitrogen was maintained for the entire time.

A white to grayish fine dispersion was obtained thus containing a polymer A X with ethylene/propylene sequences A' and methyl methacrylate/butyl methacrylate/acrylic acid sequences X' with an acid number of 24 mg KOH per gram of polymer.

6. Example of use without priming

An aluminum foil about 40 microns thick was coated with the heat seal coating dispersion given below by the use of a hand coater (without a primer being applied previously) to give a film thickness of about 1 to 2 microns when dry, and also dried for 1 minute at 180° C.

Heat seal coating dispersion:

| | |
|---|---|
| 62 wt. % | of the concentrated olefin copolymer dispersion prepared in Example 5 |
| 38 wt. % | methyl ethyl ketone |
| 100 wt. % | |

The aluminum foil so coated was then heat sealed with a laboratory heat sealing apparatus onto foils of untreated polypropylene at a heat sealing temperature of 200° C. a heat sealing pressure of 6 kp/cm²: and a heat sealing time of 1 sec. The test was further conducted in conformity with Example 4. The thermal stability observed was "good", the sealed-seam strength was found to be 7.6N.

What is claimed is:

1. A method for joining dissimilar substrates which comprises applying to at least one of said substrates a film forming dispersion of (1) a first component which is an olefin polymer or copolymer A, (2) a second component, incompatible with said first component, which is an acrylic resin X, and (3) a third component which is a block or graft polymer AX comprising segments A' of olefin polymer sequences, isoprene sequences, or butadiene/isoprene sequences, and segments X' comrising acrylic sequences, dispersed in an organic solvent system which is an equally effective solvent for said first and second components or a better solvent for said second component than for said first component, said first and second components each having an acid number ranging from 0 to 160 mg KOH per gram of polymer and having different adhesive properties, the ratio by weight of the total olefin polymer or copolymer component to the total acrylic resin component in the dispersion being from 1:20 to 20:1; removing said organic solvent system to form a film on that at least one substrate to which said dispersion has been applied; and then joining said dissimilar substrates under heat and pressure.

2. A method as in claim 1 wherein said third component is a graft polymer.

3. A method as in claim 1 wherein none of the polymers present has a carboxyl group content of more than 30 percent, by weight of the individual polymer type.

4. A method as in claim 1 wherein said graft polymer has a carboxyl group content of less than 20 weight percent.

5. A method as in claim 1 wherein said solvent system does not substantially dissolve olefin polymers or copolymers present therein.

6. A method as in claim 1 wherein the olefin polymers or copolymers have been emulsified in the solvent system in a temperature range from 40° C. to 150° C. by the use of shear forces.

7. A method as in claim 6 wherein said solvent system causes the olefin copolymers to swell, in a temperature range from 40° C. to 150° C., to a degree ranging from 5 to 300 weight percent.

8. A method as in claim 1 wherein said olefin polymers and/or copolymers A represent from 20 to 65 weight percent of the dispersion.

9. A method as in claim 1 wherein said third component is a graft polymer which represents from 1 to 80 weight percent of the dispersion.

10. A method as in claim 2 wherein the ratio by weight of the polymer units of (1) to the polymer units of (2) present in said graft copolymer is from 1:20 to 20:1.

11. A method as in claim 1 wherein said first component A is a polymer or copolymer of an olefin having from 2 to 20 carbon atoms.

12. A method as in claim 1 wherein said first component is an ethylene/propylene copolymer.

13. A method as in claim 1 wherein component X comprises at least 50 percent by weight of at least one monomer of the formula

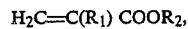

$$H_2C=C(R_1) COOR_2,$$

wherein $R_1$ is hydrogen or methyl and R is alkyl or is aliphatic or aromatic having 1 to 30 carbon atoms.

14. A method as in claim 1 wherein a metallic substrate is heat sealed onto a substrate different therefrom.

15. A method as in claim 1 wherein an aluminum substrate is heat sealed onto a substrate of polypropylene, polystyrene, or polyvinyl chloride resin.

16. A method as in claim 1 wherein an aluminum substrate is heat sealed onto glass.

17. A method as in claim 1 wherein said film is non-blocking up to at least 40° C. and above 100° C. bonds under heat sealing conditions to a second substrate to be heat sealed with said first substrate.

18. A method as in claim 1 wherein said dispersion additionally comprises an emulsifying agent of the formula BY comprising segments B' different from segments A', of olefin polymer sequences, isoprene sequences, or butadiene/isoprene sequences and segments Y', different from segments X', comprising acrylic sequences.

* * * * *